(12) United States Patent
Habboosh

(10) Patent No.: US 7,061,364 B2
(45) Date of Patent: Jun. 13, 2006

(54) THERMAL VARIABLE RESISTANCE DEVICE WITH PROTECTIVE SHEATH

(75) Inventor: Samir W. Habboosh, Hamden, CT (US)

(73) Assignee: Harco Labratories, Inc., Branford, CT (US)

( * ) Notice: Subject to any disclaimer, the term of this patent is extended or adjusted under 35 U.S.C. 154(b) by 33 days.

(21) Appl. No.: 10/793,120

(22) Filed: Mar. 4, 2004

(65) Prior Publication Data

US 2005/0104713 A1    May 19, 2005

Related U.S. Application Data

(63) Continuation-in-part of application No. 10/712,484, filed on Nov. 13, 2003.

(51) Int. Cl.
*H01C 3/04* (2006.01)

(52) U.S. Cl. .................. 338/28; 338/22 SD; 338/25

(58) Field of Classification Search .............. 338/25, 338/28, 22 R, 22 SD
See application file for complete search history.

(56) References Cited

U.S. PATENT DOCUMENTS

| | | | |
|---|---|---|---|
| 3,696,502 A * | 10/1972 | Darling | 29/527.7 |
| 3,890,456 A | 6/1975 | Dils | 428/216 |
| 4,002,503 A * | 1/1977 | Bourne et al. | 148/514 |
| 4,045,247 A | 8/1977 | Morris | |
| 4,111,718 A | 9/1978 | Morris | |
| 4,906,965 A | 3/1990 | Murata et al. | |
| 6,151,771 A | 11/2000 | Tzeng et al. | |
| 6,239,351 B1 | 5/2001 | Hall, Jr. | |
| 6,272,735 B1 | 8/2001 | Moriwake et al. | |
| 6,341,892 B1 * | 1/2002 | Schmermund | 374/185 |
| 6,354,736 B1 | 3/2002 | Cole et al. | |
| 2002/0084884 A1 * | 7/2002 | Takahashi et al. | 338/25 |

FOREIGN PATENT DOCUMENTS

| | | | |
|---|---|---|---|
| DE | 4330447 | * | 3/1995 |
| JP | 03262101 | | 11/1991 |
| WO | WO 02/080620 A1 | | 10/2002 |

OTHER PUBLICATIONS

Yukimichi abstract (09-139836) (May 1994).*
JM Noble Metals, ZGS Platinum Materials, no date.
Pages from Engelhard-Clal web site; ODS, Oxide Dispersion Strengthened Platinum-Based Materials; Copyright 2000-2001.
European Search Report, Jul. 11, 2005, 2 pages.

* cited by examiner

*Primary Examiner*—Tu Hoang
(74) *Attorney, Agent, or Firm*—St. Onge Steward Johnston & Reens LLC

(57) ABSTRACT

A sensor and method of manufacturing a variable resistance sensor with a protective sheath that is cost effective and highly reliable, with stable resistance with an operating range of up to 1700° C. in hostile environments. The sheath is formed of highly stable dispersion hardened materials capable of withstanding mechanical loads and chemical attacks at elevated temperatures while maintaining internal chemical integrity.

34 Claims, 10 Drawing Sheets

THERMAL VARIABLE RESISTANCE DEVICE WITH PROTECTIVE SHEATH

CROSS-REFERENCE

This application is a continuation in part of and claims the benefit of the filing date of U.S. patent application Ser. No. 10/712,484 filed Nov. 13, 2003.

FIELD OF THE INVENTION

The present invention relates to a device of which an electrical resistance will change in response to a change in surrounding temperature, and more specifically to the construction of a sheath formed of a material exhibiting high mechanical strength for protecting the device from physical damage.

BACKGROUND OF THE INVENTION

Conventional resistance temperature detectors (RTD), use a variety of materials to produce elements with high operating temperatures. These materials suffer from the detrimental effects of contamination, ionic migration, sublimation, oxidation and substantial decrease in mechanical strength with increased operating temperatures. Current temperature sensors are thus limited to an operating envelope of less than 650° C. (1200° F.) to ensure long term, stable output with minimum drift in resistance. Higher temperature devices can operate to temperatures up to 850° C. (1562° F.) but are either limited to specific environmental conditions (such as for instance: a vacuum environment, an inert gas environment, or a hydrogen atmosphere) and/or must be limited to short term operation to prevent premature failure. This temperature operating range has limited the application of these sensors in hostile, high temperature systems such as those commonly encountered in the aerospace, petroleum and glass industries.

Even though the temperature measurement conducted by employing a RTD is well known in the art, broad application of the RTD is still limited in high temperature hostile environments.

RTDs are useful temperature measuring devices which measure temperature by employing a variable resistant material at a point where the temperature is to be measured with lead ends connected to an instrument which measures the amount of varying voltage when power is supplied to the sensor. The resistant materials used for RTDs have been formed of various metals which provide a varying resistance upon exposure to varying heat.

Prior art temperature sensors have had the disadvantage of melting at fairly low temperature and have required insulation and various sheathing systems to protect the sensor during operation at prolonged elevated temperatures. However, this sometimes results in undesirable reactions between the metals in the temperature sensor and the materials used in the insulation and sheathing systems.

The problems of undesirable reactions in RTDs have been aggravated by the temperatures encountered in nuclear reactor systems, rocketry heat sensors, high-temperature and vacuum processing and other applications where temperature measurements at or above 1500° C. (2730° F.) are involved. RTDs have utilized sheathing and insulation in an effort to prevent the disintegration of the resistance material in such systems. The insulation and sheathing systems have the further disadvantage of resulting in time delays in obtaining temperature readings due to the insulation and mechanical packaging designed to prevent failure resulting from such problems as gas leakage at the RTD sheath seals, cracked sheaths and other mechanical limitations imposed by ceramic insulated metal sheathed sensors.

Platinum, being chemically stable and having high temperature dependency of electrical resistance, is employed as to a material for temperature sensors, and specifically, for RTDs. In a conventional platinum temperature sensor, a platinum wire is spirally wound on an insulator, or a platinum resistance pattern is formed as a thick or thin film on a substrate.

Other high melting, noble metals such as rhodium (Rh), palladium (Pd), iridium (Ir) as well as precious metals such as gold (Au) and silver (Ag), and alloys thereof are known in the art. Such metals, however, are not widely used because they are more susceptible to oxidation than platinum, and degrade by drift caused by selective oxidation.

Some of the characteristics of platinum can be improved by the usual alloy hardening method of adding a metal to the platinum base, followed by heat treatment. However, problems can occur after alloying. For example, when a high concentration of any alloying element is added to the platinum base, the electrical properties of the resulting platinum limb become inferior; at the same time the hardening phase will partially or totally dissolve into the base at high temperatures, thus the effects of the hardening action are reduced.

The prior art attempts to extend the operation range of variable-resistance temperature device have been limited to extending the range of known resistant materials through the use of insulation techniques or increasing the high temperature properties of known materials through alloying processes or coatings. The disadvantages of these techniques, including not reaching a high enough operating temperature, are discussed above. A significant benefit, however, is that the conversion of the output signal generated by the known resistant material is readily available through National Institute of Standards and Technology (N.I.S.T.) or International Electrotechnical Commission (I.E.C.) standard tables.

Conversely, if a resistant material was chosen based on its desired high temperature operating properties, and not based on providing a known resistance output, then higher operating range variable-resistance temperature device could be made, provided that the output signal of the resistant material is repeatable and convertible.

Dispersing oxides of transition metals or rare earth metals within noble or precious metals is an example of a method of creating variable resistant material with the desired extended temperature properties. For instance, dispersion hardened platinum materials (Pt DPH, Pt-10% Rh DPH, Pt-5% Au DPH) are useful materials because they achieve very high stress rupture strengths and thus permit greatly increased application temperatures than the comparable conventional alloys and are rugged.

Dispersion hardening (DPH) creates a new class of metal materials having resistance to thermal stress and corrosion resistance that is even greater than that of pure platinum and the solid solution hardened platinum alloys. When operational life, high temperature resistance, corrosion resistance and form stability are important, a sensor can be manufactured of DPH platinum and can be used at temperatures close to the melting point of platinum.

Dispersion hardened materials contain finely distributed transition element oxide particles which suppress grain growth and recrystallization even at the highest temperatures and also hinder both the movement of dislocations and sliding at the grain boundaries. The improved high temperature strength and the associated fine grain stability offer considerable advantages.

Platinum: Platinum-Rhodium Thermocouple Wire: Improved Thermal Stability on Yttrium Addition Platinum, By Baoyuan Wu and Ge Liu, Platinum Metals Rev., 1997, 41, (2), 81–85 is incorporated by reference. The Wu article discloses a process of dispersion hardening platinum for a platinum; platinum-rhodium thermocouple wire which incorporates traces of yttrium in the platinum limb.

As described in the Wu article, the addition of traces of yttrium to platinum as a dispersion phase markedly increases the tensile strength of the platinum at high temperature, prolongs the services life and improves the thermal stability. Yttrium addition prevents the growth in the grain size and helps retain the stable fine grain structure, as the dispersed particles of high melting point resist movements of dislocations and make the materials harder. The strength of a material is related to the movement and number of the dislocations.

In order to harden metals, the movement of the dislocations needs to be restricted either by the production of internal stress or by putting particles in the path of the dislocation. After the melting and annealing process, the majority of the trace yttrium (in the dispersion phase of the platinum) becomes yttrium oxide, which has a much higher melting point than platinum. When the temperature is near the melting point, dispersion hardened particles fix the dislocation, thus hardening the platinum and increasing its strength.

At the same time the grain structure becomes stable after dispersion hardening and there is also microstructural hardening. The dispersed particles affect the recrystallization dynamics, inhibit rearrangement of the dislocations on the grain boundaries and prevent the movement of the grain boundaries. Therefore, this dispersion hardened platinum possesses a stable fine grain structure at high temperature.

This patent outlines a variable-resistance temperature sensor with a protective sheath capable of protecting and extending the operating range of this class of sensor up to 1700° C. (3092° F.).

SUMMARY OF THE INVENTION

Accordingly, it is an object of the present invention to provide sensor with a rugged sheath exhibiting high mechanical hardness for protection of the sensor and/or conductors connected thereto.

Accordingly, it is another object of the present invention to provide an extended temperature range thermal variable resistance device with enhanced high temperature operating characteristics and long term, stable output and minimum drift in resistance.

Another object of the present invention is to provide an extended temperature range thermal variable resistance device that can be configured as a resistance temperature device for the purpose of measuring localized temperature. Yet another object of the present invention is to provide an extended temperature range thermal variable resistance device which in dual mode operation can be implemented as a heat flux sensor.

Still another object of the present invention is to provide a thermal variable resistance device implementing electronics to condition the output and convert it to specified calibrated reference data, or to an industry standard such as a National Institute of Standards and Technology reference or an International Electrotechnical Commission reference.

Yet another object of the present invention is to provide a method for the production of a cost effective, high reliability, stable resistance device with an operating range of up to 1700° C. (3092° F.) in hostile environments.

These and other objects of the present invention are achieved in one advantageous embodiment by a sensor comprising a resistor deposited on a substrate, the resistor exhibiting a change in resistance with a change in ambient temperature, and a first conductor formed from a first conductor material, the first conductor electrically connected to the resistor. The sensor further comprises a second conductor formed from a second conductor material, the second conductor electrically connected to the resistor, and a sheath enclosing at least the resistor, the sheath formed of a sheath material having at least one noble metal and an oxide selected from the group consisting of yttrium oxide, cerium oxide, zirconium oxide, and combinations of these.

It is contemplated that virtually any standard thermal resistive device may effectively be utilized in connection with the sheath comprising the above-described sheath material.

In another advantageous embodiment a method for manufacturing a sensor is provided comprising the step of positioning a resistor formed from a resistor material on a substrate. The method further comprises the steps of electrically connecting a first conductor to the resistor, the first conductor formed from a first conductor material, and electrically connecting a second conductor to the resistor, the second conductor formed from a second conductor material. The method still further comprises the steps of forming a sheath of a material having at least one noble metal and an oxide selected from the group consisting of yttrium oxide, cerium oxide, zirconium oxide, and combinations of these, and enclosing at least the resistor within the sheath.

In still another advantageous embodiment a sensor is provided comprising a resistor exhibiting a change in resistance with a change in ambient temperature. The sensor further comprises a first conductor formed from a first conductor material, the first conductor electrically connected to the resistor, and a second conductor formed from a second conductor material, the second conductor electrically connected to the resistor. The sensor still further comprises a sheath enclosing at least the first and second conductors, the sheath formed of a sheath material having at least one noble metal and an oxide selected from the group consisting of yttrium oxide, cerium oxide, zirconium oxide, and combinations of these.

In yet another advantageous embodiment a sensor is provided that is resistant to degradation at high temperature having a resistor formed from at least one noble metal and an oxide. The oxide may in one advantageous embodiment, comprise yttrium oxide, cerium oxide, zirconium oxide, and limited combinations of these and is disposed on a substrate. The sensor having at least a first and second lead connected to the resistor for transmitting an electrical signal. The resistor may for instance, be wound around the substrate or deposited on said substrate.

In still another advantageous embodiment a method for manufacturing a sensor is provided comprising the steps of positioning a resistor formed from a resistor material on a substrate, electrically connecting a first conductor to the resistor, the first conductor formed from a first conductor material, and electrically connecting a second conductor to the resistor, the second conductor formed from a second conductor material. The method further comprises the steps of forming a sheath of a material having at least one noble metal and an oxide selected from the group consisting of yttrium oxide, cerium oxide, zirconium oxide, and combinations of these, and enclosing at least the first conductor and the second conductor within the sheath.

The objects of the present invention are further achieved in another embodiment by providing a sensor which is resistant to degradation at high temperature having a resistor formed from an oxide. The oxide may in one advantageous embodiment, comprise the transition element oxides and rare earth metal oxides, and combinations of these, where the oxide is dispersion hardened within the grain boundary and within the base material of at least one base metal. The base metal may in one advantageous embodiment, comprise the noble metals and the precious metals, and combination of these, and is disposed on a substrate. The sensor having at least a first and second lead connected to the resistor for transmitting an electrical signal.

The objects of the present invention are achieved in yet another embodiment by a method of manufacturing a high temperature resistant sensor by forming a resistor from at least one noble metal and an oxide selected from the group consisting of yttrium oxide, cerium oxide, zirconium oxide, and combinations of these. The method further comprises the step of disposing the resistor on a substrate by either winding the resistor around the substrate or by depositing the resistor on the substrate. Finally, the method comprises the step of attaching at least a first and second lead to the resistor for transmitting an electrical signal.

The objects of the present invention are further achieved in another embodiment by providing a sensor which is resistant to degradation at high temperature having a resistor that is formed from an oxide selected from the group consisting of yttrium oxide, cerium oxide, zirconium oxide, and combinations of these, said oxide dispersion hardened within the grain boundary of platinum and is disposed on a substrate. The sensor also having at least a first and second lead connected to the resistor for transmitting an electrical signal and a transducer.

The objects of the present invention, in each of the above described embodiments, could be further achieved where an electrical signal comprises a varying voltage and is applied to a transducer. The transducer may be a temperature measuring device. The output of the transducer may correlate to a temperature or a logic function applied to specific calibration data to determine the temperature. The transducer output could correlate to a standard reference output, or could correlate specifically to a National Institute of Standards and Technology or to an International Electrotechnical Commission reference.

In still another advantageous embodiment a modular sensor system for generating and sending a signal from a sensor to a transducer is provided comprising a sensor for generating a signal having a substrate and a resistor, disposed on the substrate, formed from at least one noble metal and an oxide selected from the group consisting of yttrium oxide, cerium oxide, zirconium oxide, and combinations of these, the resistor further having first and second conductors electrically connected thereto. The system further comprises a transmit lead module for transmitting the signal to the transducer, the transmit lead module having a first transmit lead electrically connected to the first conductor, and a second transmit lead electrically connected to the second conductor, the second transmit lead comprising a different material than the first transmit lead. The transmit lead module also has an insulating layer within which the first transmit lead and the second transmit lead are located, and an outer layer within which the insulating layer is located.

In yet another advantageous embodiment a modular sensor system for generation of a signal by a sensor and for sending of the signal via first and second electrical conductors to a transducer is provided comprising, a transmit lead module for transmitting the signal to the transducer. The transmit lead module has a first transmit lead electrically connected to the first conductor, and a second transmit lead electrically connected to the second conductor. The transmit lead module further has an insulating layer within which the first transmit lead and the second transmit lead are located, and an outer layer within which the insulating layer is located, the outer layer comprising the same material as said first transmit lead.

The invention and its particular features and advantages will become more apparent from the following detailed description considered with reference to the accompanying drawings.

DETAILED DESCRIPTION OF THE DRAWINGS

Figure 1:
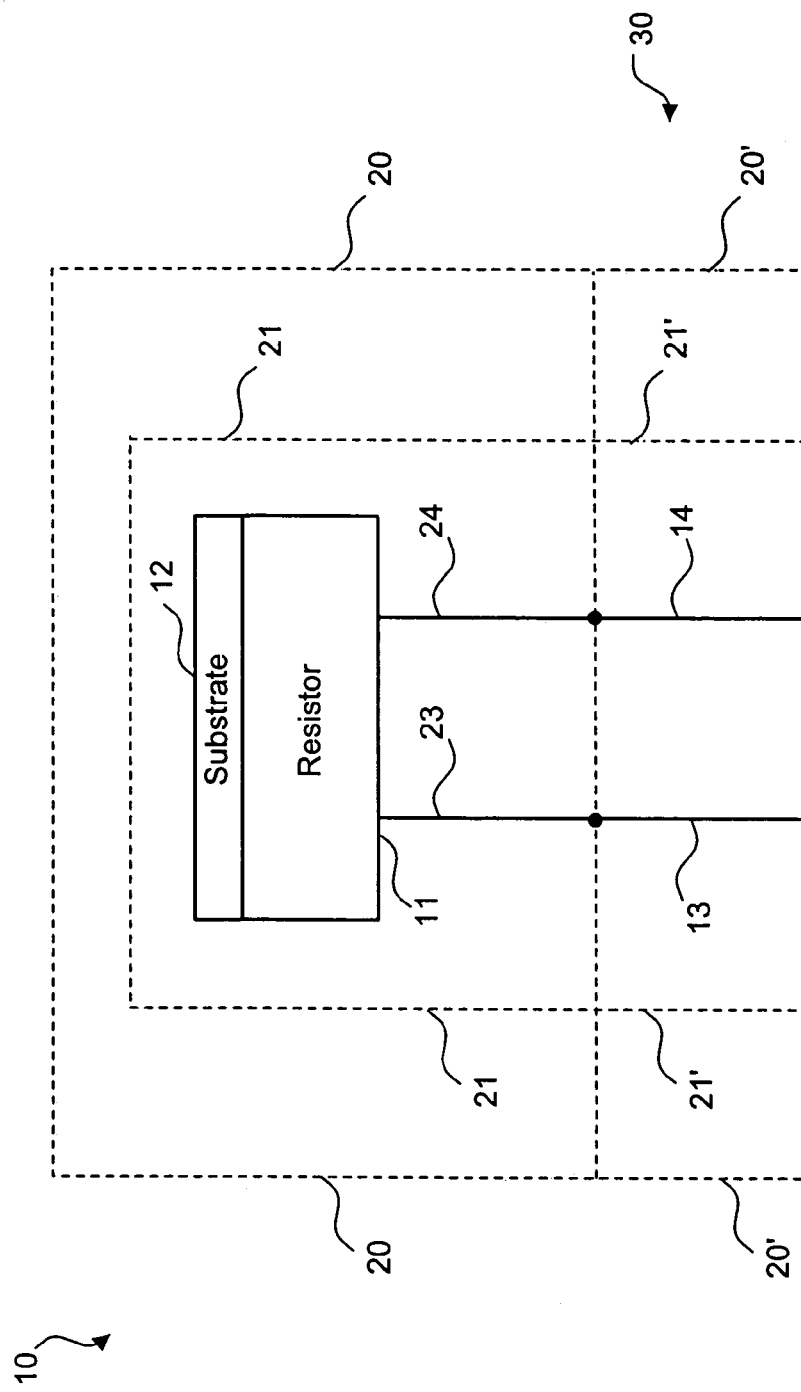
FIG. 1 is a block diagram of one advantageous embodiment of the present invention.

Referring now to the drawings, wherein like reference numerals designate corresponding structure throughout the views.

FIG. 1 is a block diagram illustrating one preferred embodiment of the present invention showing sensor 10. A substrate 12 is shown in contact with a resistor 11. Also shown are first conductor 23 and second conductor 24 electrical both of which are shown connected to resistor 11.

Sensor 10 is further illustrated in FIG. 1 with insulation 21. The insulation may comprise any suitable insulating material desired including but not limited to a refractory ceramic material such as for instance, $Al_2O_3$ or MgO. Although insulation 21 is shown in FIG. 1 enclosing sensor 10, it is contemplated that insulation 21 may only enclose a portion of sensor 10, such as for instance, first and second conductors 23, 24 or resistor 11, or any other portion thereof.

Also illustrated in FIG. 1 is sheath 20 shown enclosing insulation 21. Sheath 20 may comprise, for instance, a noble metal such as a platinum group metal, and a metal oxide selected from the group consisting of yttrium oxide, cerium oxide, zirconium oxide, and combinations of these. It is further contemplated that through an annealing process called dispersion hardening, the metal oxides may be deposited within the grain boundaries and main body of the noble metal. This process produces a sheath 20 formed of a highly stable material capable of withstanding mechanical loads and chemical attacks at elevated temperatures while maintaining its internal chemical integrity. This is highly desirable especially in hostile environments where the sensor is subjected to mechanical stress and/or a wide range of temperatures.

Figure 1A:
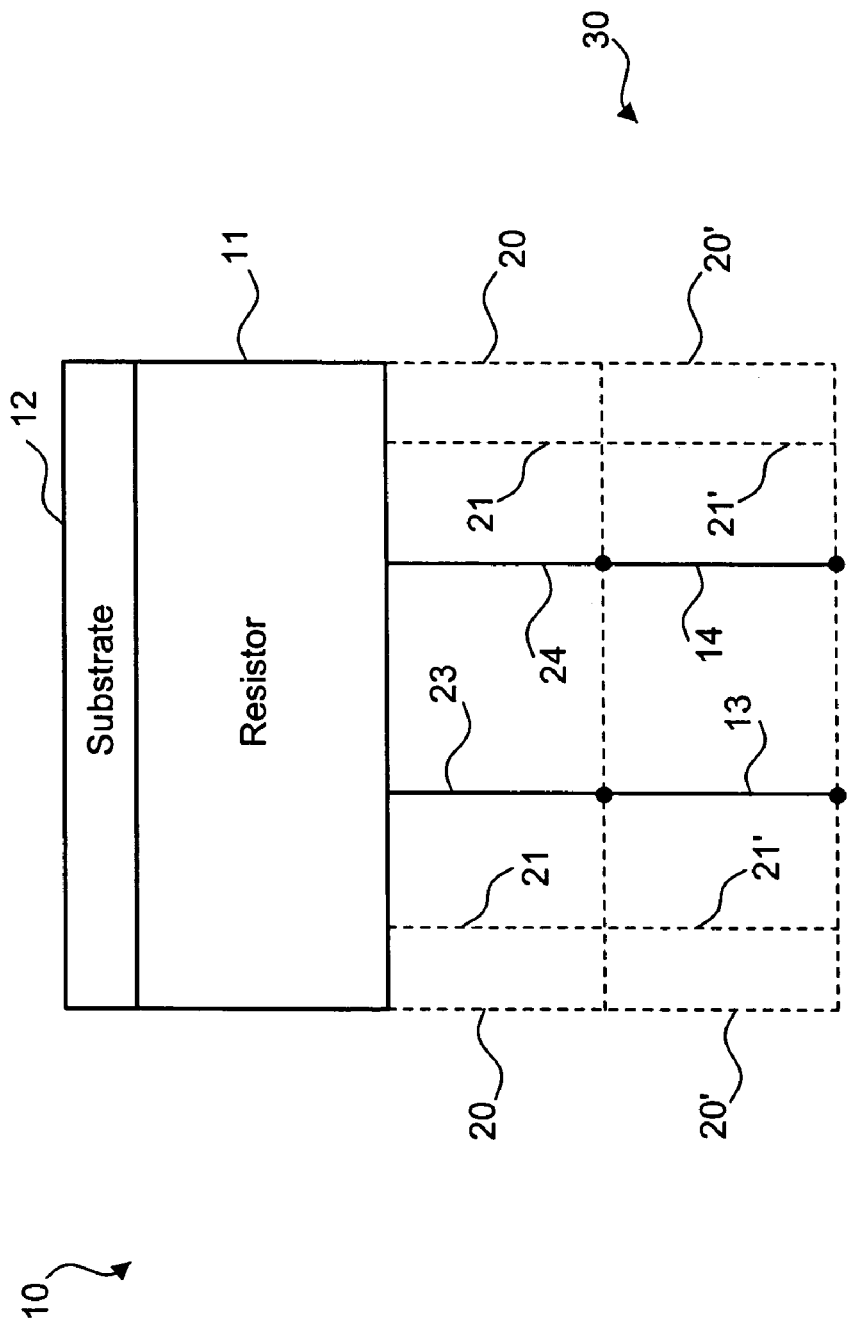
FIG. 1A is a block diagram of another advantageous embodiment of the present invention according to FIG. 1.
Figure 1B:
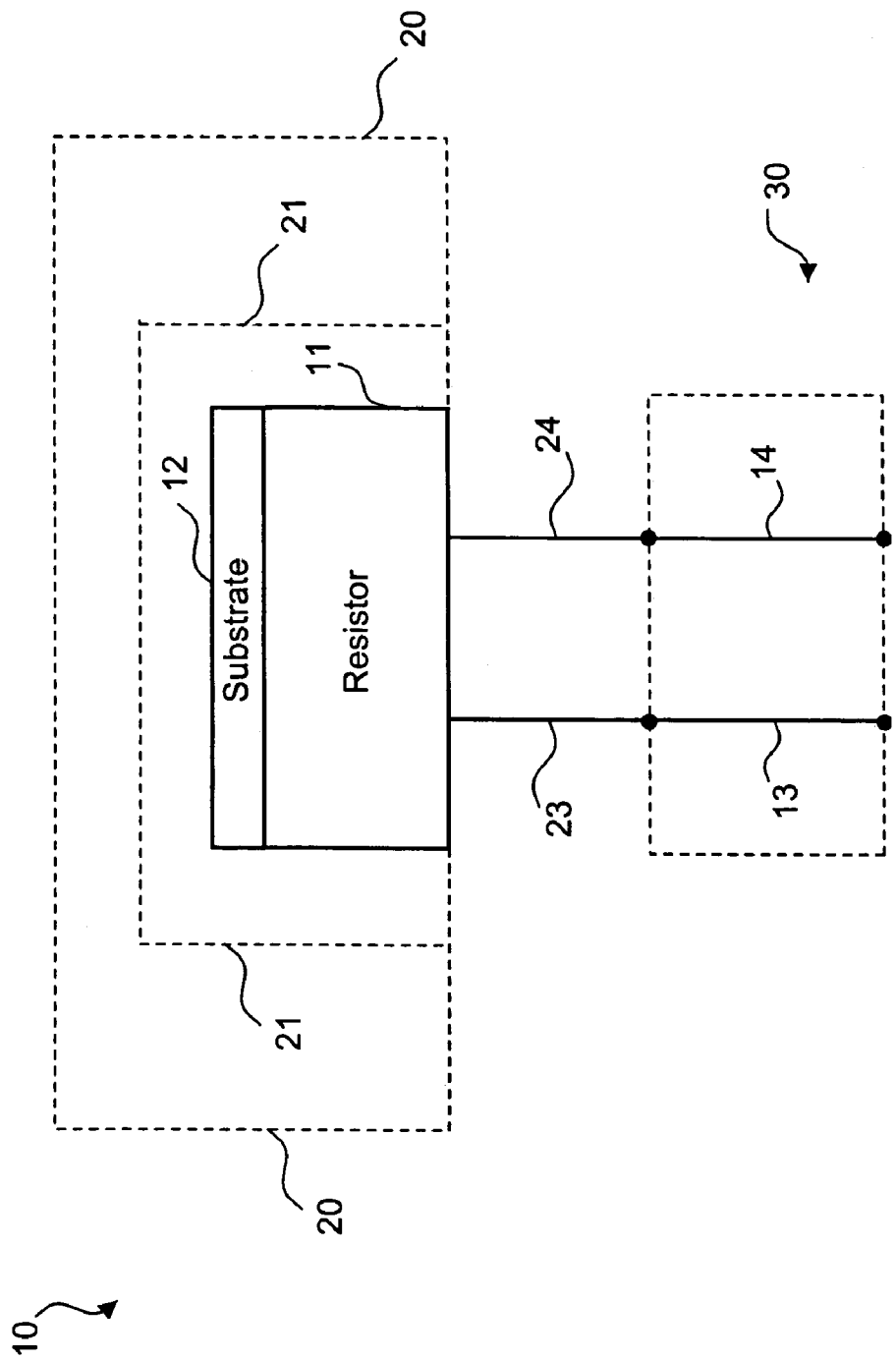
FIG. 1B is a block diagram of still another advantageous embodiment of the present invention according to FIG. 1.

In one preferred embodiment sheath 20 comprises platinum, having yttrium oxide or yttrium and zirconium oxide dispersed within its grain boundary and within the main bodyportion. In another preferred embodiment the sheath 20 comprises a platinum rhodium alloy (10% rhodium) having yttrium oxide or yttrium and zirconium oxide dispersed within its grain boundary and within the main body. Although sheath 20 is shown in FIG. 1 enclosing sensor 10, it is contemplated that sheath 20 may only enclose a portion of sensor 10, such as for instance, first and second conductors 23, 24 (FIG. 1A) or resistor 11 (FIG. 1B) or any other portion thereof.

It is contemplated that virtually any standard thermal resistive device may effectively be utilized as resistor 11 in connection with sheath 20 comprising the above-described sheath material.

Still further illustrated in FIG. 1 is transmit lead module 30 that includes transmit leads 13, 14. Also illustrated in FIG. 1 is transmit lead module insulation 21' enclosing transmit leads 13, 14. Transmit lead module insulation 21' may comprise any material as previously described in connection with insulation 21. Further illustrated is transmit lead module sheath 20', which encloses transmit lead module insulation 21'. Transmit lead module sheath 20' may also comprise any material as previously described in connection with sheath 20. It is further contemplated that, although only one transmit lead module 30 is shown in FIG. 1, any number may be connected together, for instance in an end-to-end fashion, as required depending upon the installation.

Referring now to FIGS. 2–5, a sensor 10, is made with a resistor 11 of a class of materials chosen to be resistant to degradation in high temperature operation up to 1700° C. (3090° F.) and deposited on and/or around a substrate 12. The class of materials is made up of one or more base metals, usually a noble metal, with metal oxides. In one advantageous embodiment the metal oxides may comprise yttrium oxide, cerium oxide, zirconium oxide, and combinations of these. Through an annealing process not described herein, the metal oxides may be deposited within the grain boundaries and main body of the base metal. The process is called dispersion hardening. This has the effect of stabilizing the grain structure of the material at extended temperatures and provides an increased resistance path for impurities. The net effect is a highly stable material capable of withstanding mechanical loads and chemical attacks at elevated temperatures while maintaining its internal chemical integrity. This provides the foundation for an extended temperature variable resistance device with long term, stable output and minimum drift in resistance.

The base metal may be chosen from the noble metals such as for instance, the platinum group metals. It is preferable that the resistor 11 be made of platinum or Pt/Rh, having yttrium oxide or yttrium and zirconium oxide dispersed within its grain boundary. However, it is foreseeable that the resistor could be formed from an oxide from the group consisting of the transition metals or the rare earth metals, or a combination thereof, dispersion hardened within the grain boundary of a base and main body metal consisting of the noble metals or the precious metals, or combinations thereof.

Figure 2:
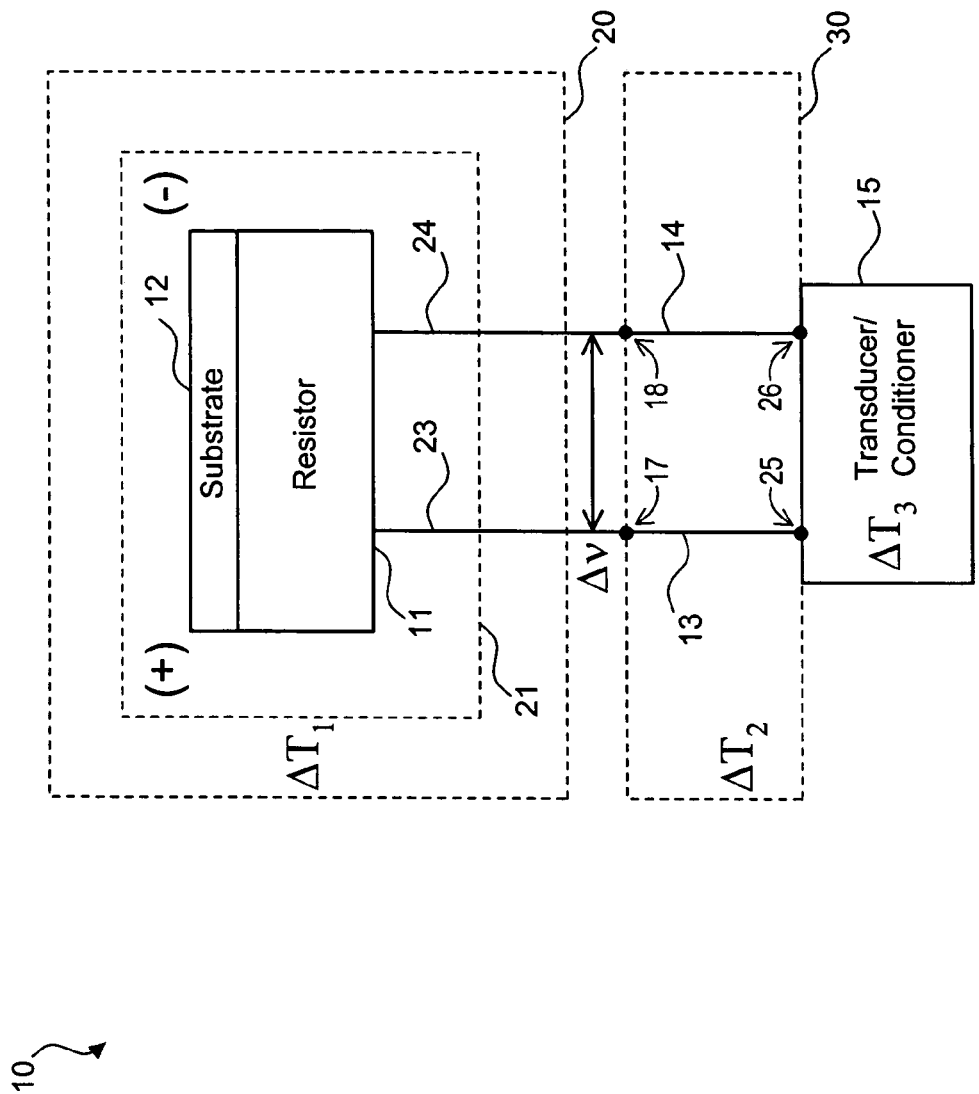
FIG. 2 is an illustration of yet another advantageous embodiment of the present invention according to FIG. 1.
Figure 3:
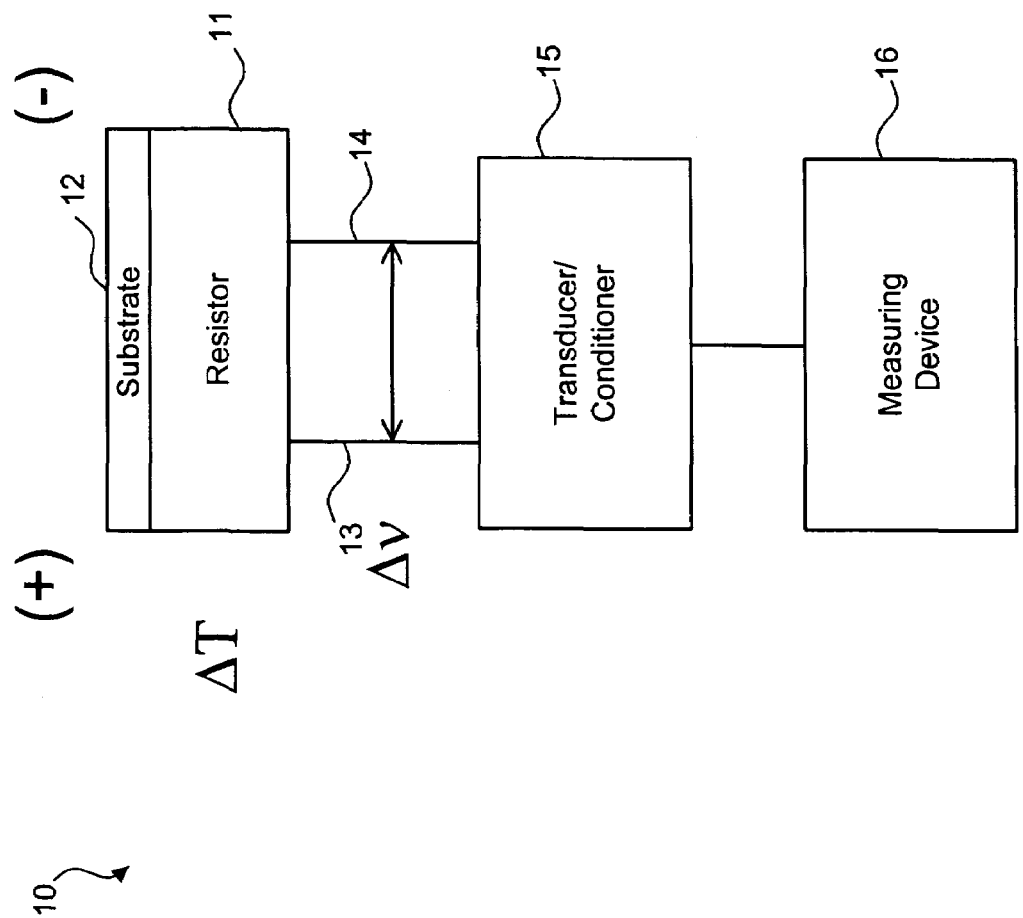
FIG. 3 is a block diagram of a component configuration according to FIG. 2.
Figure 4:
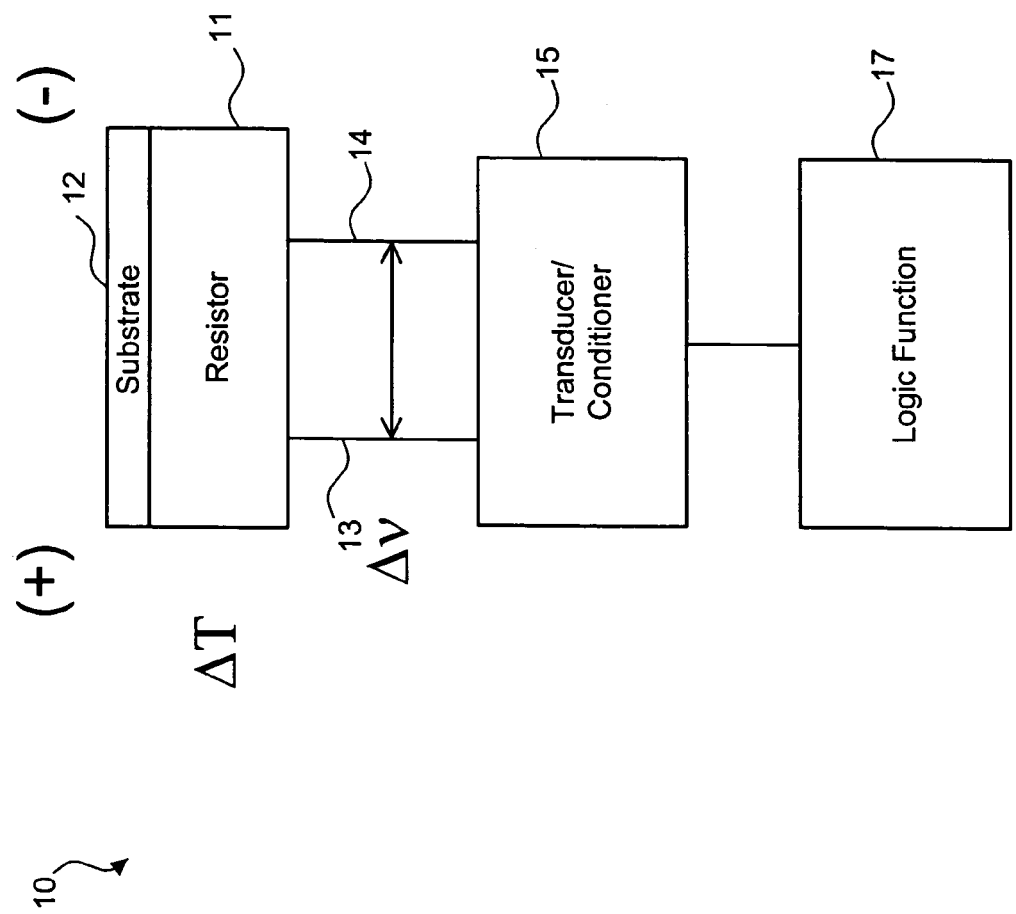
FIG. 4 is a block diagram of another component configuration according to FIG. 2.

The resistor 11, with any across sectional geometry, may be wound around a nonconductive, high temperature substrate to a predetermined resistance value. (See FIG. 5). Similarly the resistor material can be deposited on a substrate to form an element of desired resistance. (FIGS. 2–4). The size of the resistor is dictated by the required resistance, cross sectional geometry of the resistor material and coefficient of electrical resistance of the resistor material.

The substrate may be made from the same class of material as the resistor, having at least one noble metal with a metal oxide from the group consisting of yttrium oxide, cerium oxide, zirconium oxide, and combinations of these, dispersed within its grain boundary. Refractory materials or one of the base materials coated with a high temperature insulator of varying compositions such $Al_2O_3$ or MgO may also be used as the substrate. The substrate may also be formed with a thin insulating coating from at least one noble metal with a metal oxide from the group consisting of yttrium oxide, cerium oxide, zirconium oxide, and combinations of these.

In one advantageous embodiment, electrical leads 23, 24 for transmitting an electrical signal, may be electrically connected between resistor 11 and a transducer/conditioner 15. In addition, transmit leads 13, 14 may comprise different material compositions than the electrical leads 23, 24 creating a junction at 17, 18. Another possible junction point 25, 26 may comprise still another differing material composition than the transmit leads 13, 14. However, the sensor could be formed such that one or both of the wire components may transmit the electrical signal to the transducer/conditioner 15. It should also be noted that the electrical signal may be electrically compensated for these junction points of differing compositions.

The resistor may also be housed in a sheath 20 to protect it from the hostile environments in which the sensor operates. The sheath 20 may be formed of a high temperature alloy or made from the same class of material as the resistor, having at least one noble metal with a metal oxide from the group consisting of yttrium oxide, cerium oxide, zirconium oxide, and combinations of these, dispersed within its grain boundary.

The sensor may be insulated between the resistor 11 and the sheath 20. The insulation 21 may be a refractory material such as $Al_2O_3$ or MgO. (FIG. 2).

In operation, the resistor is exposed to a temperature gradient ΔT. The resistance value of the resistor varies in response to the temperature gradient. A power source is applied to the sensor and activates the sensor. The power source may be, for instance, a constant current. An electric signal is generated, which may be, for instance, a varying voltage. The varying voltage may be a function of the temperature gradient and the varying resistance of the resistor. The electrical signal is then transmitted to transducer 15.

In one advantageous embodiment illustrated in FIG. 2, electrical leads 23, 24 terminate at junctions 17, 18 respectively. From junctions 17, 18 transmit leads 13, 14 extend to junction point 25, 26 to terminate at transducer/conditioner 15. In FIG. 2, transmit leads 13, 14 are illustrated located inside transmit lead module 30.

Figure 2A:
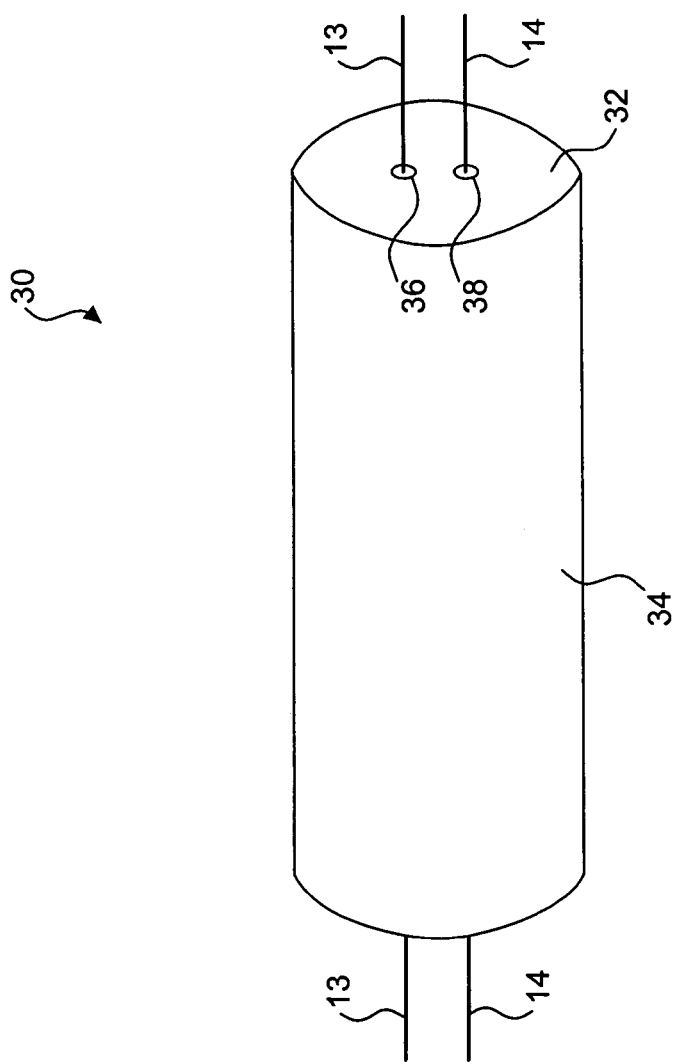
FIG. 2A is an illustration of a transmit lead module according to FIG. 2.

The structure and method for manufacturing transmit lead module 30 in one advantageous embodiment as illustrated in FIG. 2A, will now be described. Transmit lead module 30 generally comprises: transmit leads 13, 14; insulating layer 32; and outer layer 34. Transmit leads 13, 14 may comprise any suitable materials as previously described herein in connection with FIG. 2. Insulating layer 32 may comprise, for instance, a refractory ceramic material such as Al$_2$O$_3$ or MgO generally formed into an elongated member, such as for instance, a cylinder. Also illustrated in FIG. 2A are two through holes 36, 38 extending axially through the length of insulating layer 32 through which transmit leads 13, 14 are respectively inserted. Surrounding and encasing insulating layer 32 is outer layer 34. Outer layer 34 may comprise in one advantageous embodiment, the same material as one of transmit leads 13, 14. One advantage realized from this particular configuration is that one of the electrical lead/transmit lead junctions may be eliminated.

Once the insulating layer 32 containing transmit leads 13, 14 is inserted into outer layer 34, the entire transmit lead module 30 may be swaged. The compression of transmit lead module 30 causes insulating layer 32 to be compressed and tightly crushed such that air is evacuated and any air pockets within transmit lead module 30 may be effectively eliminated.

Any number of transmit lead modules 30 may then be tied together depending upon the distance between the sensor and the transducer/conditioner 15. This provides versatility and modularity to the system as the installer may utilize any number of transmit lead modules 30 in an installation. Transmit lead modules 30 may further be bent and manipulated as desired to custom fit a particular installation. The outer layer 34 being rigid further provides protection for transmit leads 13, 14 from wear, abrasion and repeated bending and/or flexing. This will increase the effective lifespan of the system. In addition, as previously discussed, transmit lead modules 30 may be joined together with each other in an end-to-end fashion with transmit leads 13, 14 in the first transmit lead module 30 forming a junction with transmit leads 13, 14 in the second transmit lead module 30. However, when the exterior layer 34 for both the first and second transmit lead modules 30 comprises the same material as one of the transmit leads 13, 14, then the corresponding transmit lead junction may be eliminated further simplifying the system.

In one advantageous embodiment, the sensor may be configured as a Resistance Temperature Detector (RTD) for the purpose of measuring localized temperature averaged over the surface of the active area. The output from the transducer would then be a temperature reading from a temperature measuring device 16. (FIG. 3). Certain reference conversions exist to determine temperature from a varying voltage output from a RTD. These standards are determined by such agencies as the National Institute of Standards and Technology and the International Electrotechnical Commission. The standards are based upon the properties of the material of the resistor and the temperature ranges to which the RTD is subjected.

No standard reference to correlate the varying voltage to a temperature reading is available for the class of materials used in the present invention. Accordingly, a logic function 17 (FIG. 4) can be applied to the varying voltage to convert it to one of the known industry standards. This would make the RTD an off the shelf component.

The output of the sensors need not be converted to an NIST standard to make it usable. In some applications, calibration data can be supplied along with a basic algorithm which would be implemented in a control system developed by an outside source. In this case the algorithms would be customized to the user's particular application.

In dual mode operation, the sensor could be implemented as a heat flux sensor.

Figure 5:
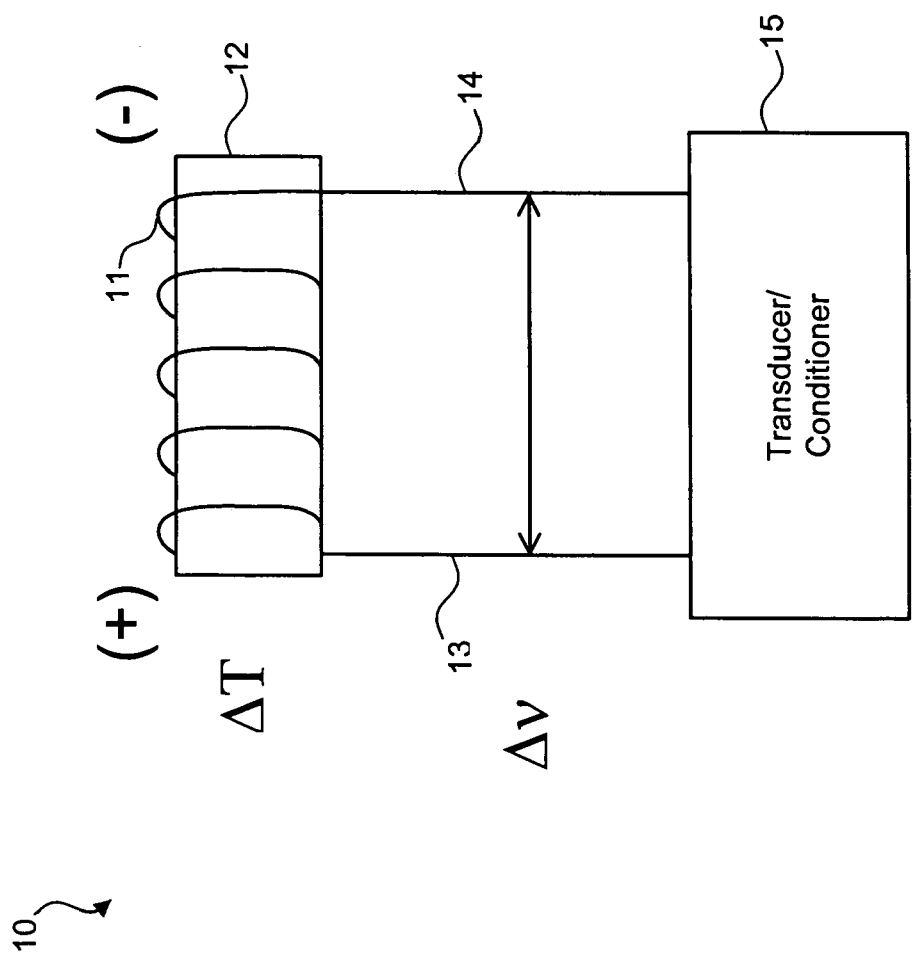
FIG. 5 is an illustration of the resistor wound around the substrate according to one advantageous embodiment illustrated in FIG. 2.

While not shown, it should be noted that resistor 11, wound around the nonconductive, high temperature substrate as illustrated in FIG. 5, may also effectively be utilized with temperature measuring device 16 and logic function 17. (FIGS. 3 and 4).

Figure 6:
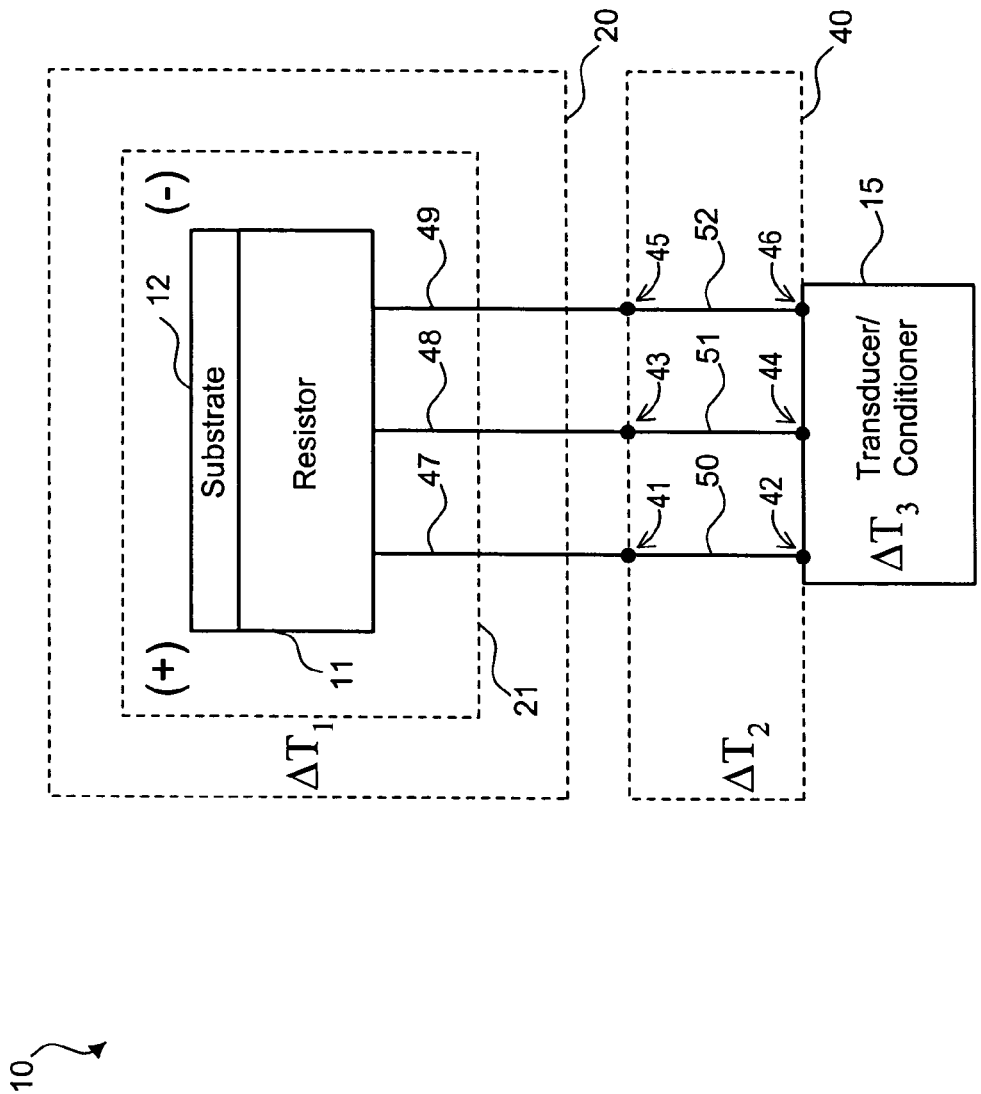
FIG. 6 is a block diagram of still another advantageous embodiment of the present invention.
Figure 7:
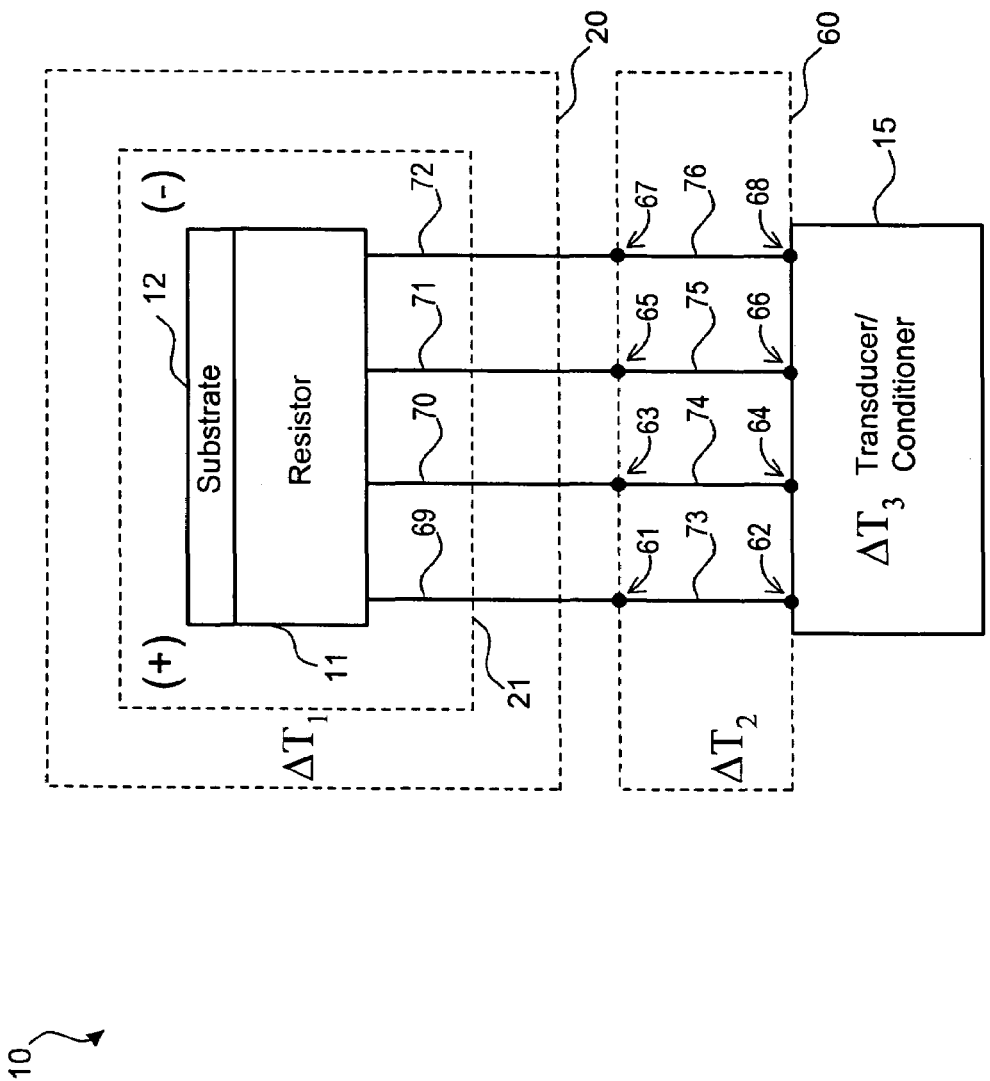
FIG. 7 is a block diagram of yet another advantageous embodiment of the present invention.

FIGS. 6 and 7 are similar to FIG. 2 comprising a sensor 10 having a resistor 11 deposited on and/or around substrate 12 with an insulation 21 located between resistor 11 and sheath 20 and further comprising transducer/conditioner 15.

FIG. 6 differs from FIG. 2 in that three electrical leads (47, 48, 49) are electrically connected to resistor 11. FIG. 6 further comprises transmit lead module 40, which also is configured with three transmit leads (50, 51, 52) forming junctions (41, 43, 45) where electrical leads (47, 48, 49) and transmit leads (50, 51, 52) meet and junctions (42, 44, 46) where transmit leads (50, 51, 52) meet transducer/conditioner 15. A variable voltage may then be measured across any combination of these leads.

Another alternative embodiment is illustrated in FIG. 7 which is similar to FIG. 6 except four electrical leads (69, 70, 71, 72) are electrically connected to resistor 11. FIG. 7 further comprises transmit lead module 60, which also is configured with four transmit leads (73, 74, 75, 76) forming junctions (61, 63, 65, 67) where electrical leads (69, 70, 71, 72) and transmit leads (73, 74, 75, 76) meet and junctions (62, 64, 66, 68) where transmit leads (73, 74, 75, 76) meet transducer/conditioner 15. A variable voltage may then be measured across any combination of these leads.

While various combinations, i.e. two leads (FIG. 2), three leads (FIG. 6), and four leads (FIG. 7), have been illustrated herein, it is contemplated that any varying number of leads may advantageously be utilized in connection with the present invention.

Those skilled in the art may tailor the present invention to suit a particular requirement. It will be understood that these or other types of changes and substitutions may be made within the spirit and scope of the invention as defined in this claim.

What is claimed is:

1. A sensor comprising:
   a resistor deposited on a substrate, said resistor exhibiting a change in resistance with a change in ambient temperature, said resistor comprising a noble metal and an oxide selected from the group consisting of yttrium oxide, cerium oxide, zirconium oxide, and combinations of these;
   a first conductor formed from a first conductor material, said first conductor electrically connected to said resistor;
   a second conductor formed from a second conductor material, said second conductor electrically connected to said resistor; and
   a sheath enclosing at least said resistor, said sheath formed of a sheath material having at least one noble metal and an oxide selected from the group consisting of yttrium oxide, cerium oxide, zirconium oxide, and combinations of these;
   said sheath being electrically insulated from said first and said second conductors.

2. The sensor of claim 1 wherein the first conductor material and the second conductor material are the same.

3. The sensor of claim 2 wherein the first conductor material and the second conductor material are different than the sheath material.

4. A sensor comprising:
- a resistor exhibiting a change in resistance with a change in ambient temperature said resistor comprising a noble metal and an oxide selected from the group consisting of yttrium oxide, cerium oxide, zirconium oxide, and combinations of these;
- a first conductor formed from a first conductor material, said first conductor electrically connected to said resistor;
- a second conductor formed from a second conductor material, said second conductor electrically connected to said resistor; and
- a sheath, electrically insulated from and enclosing at least said first and second conductors, said sheath formed of a sheath material having at least one noble metal and an oxide selected from the group consisting of yttrium oxide, cerium oxide, zirconium oxide, and combinations of these.

5. The sensor of claim 1 further comprising an insulting layer enclosing said first and second conductors.

6. The sensor of claim 5 wherein said insulating layer is enclosed by said sheath.

7. The sensor of claim 1 wherein the noble metal is a platinum group metal.

8. The sensor of claim 7 wherein the noble metal is platinum.

9. The sensor of claim 8 wherein the oxide is dispersion hardened within grain boundaries and a main body portion of the platinum.

10. The sensor of claim 9 wherein the sheath material further comprises yttrium oxide and zirconium oxide.

11. The sensor of claim 7 wherein the noble metal is platinum rhodium alloy.

12. The sensor of claim 11 wherein the oxide is dispersion hardened within grain boundaries and a main body portion of the platinum rhodium alloy.

13. The sensor of claim 12 wherein the sheath material further comprises yttrium oxide and zirconium oxide.

14. The sensor of claim 13 wherein the platinum rhodium alloy is Pt-10% Rh.

15. A sensor comprising:
- a resistor deposited on a substrate, said resistor exhibiting a change in resistance with a change in ambient temperature;
- said substrate is formed with a thin insulating coating from at least one noble metal and an oxide selected from the group consisting of: yttrium oxide, cerium oxide, zirconium oxide, and combinations of these;
- a first conductor formed from a first conductor material, said first conductor electrically connected to said resistor;
- a second conductor formed from a second conductor material, said second conductor electrically connected to said resistor; and
- a sheath and enclosing at least said first and second conductors, said sheath formed of a sheath material having at least one noble metal and an oxide selected from the group consisting of yttrium oxide, cerium oxide, zirconium oxide, and combinations of these.

16. The sensor according to claim 15 further comprising:
- a transmit lead module having,
    - a first transmit lead formed of a first transmit lead material, for electrically connecting to said first conductor;
    - a second transmit lead formed of a second transmit lead material, for electrically connecting to said second conductor; and
    - a transmit lead module sheath enclosing said first transmit lead and said second transmit lead.

17. The sensor according to claim 16 wherein said transmit lead module sheath is formed of a second noble metal and an oxide selected from the group consisting of yttrium oxide, cerium oxide, zirconium oxide, and combinations of these.

18. The sensor according to claim 17 wherein said transmit lead module further comprises an insulating layer enclosing said first transmit lead and said second transmit lead.

19. The sensor according to claim 18 wherein said transmit lead module sheath encloses said insulating layer.

20. The sensor according to claim 15 wherein the first conductor material and the second conductor material are the same.

21. The sensor according to claim 20 wherein the first conductor material and the second conductor material are different than the sheath material.

22. The sensor according to claim 15 wherein the noble metal is a platinum group metal.

23. The sensor according to claim 22 wherein the noble metal is platinum.

24. The sensor according to claim 23 wherein the oxide is dispersion hardened within grain boundaries and a main body portion of the platinum.

25. The sensor according to claim 24 wherein the sheath material further comprises yttrium oxide and zirconium oxide.

26. The sensor according to claim 22 wherein the noble metal is a platinum rhodium alloy.

27. The sensor according to claim 26 wherein the oxide is dispersion hardened within grain boundaries and a main body portion of the platinum rhodium alloy.

28. The sensor according to claim 27 wherein the sheath material further comprises yttrium oxide and zirconium oxide.

29. The sensor according to claim 26 wherein the platinum rhodium alloy is Pt-10% Rh.

30. The sensor according to claim 15 further comprising a substrate for receiving said resistor.

31. The sensor according to claim 30 wherein said resistor is wound around said substrate.

32. The sensor according to claim 30 wherein said resistor is deposited on said substrate.

33. The sensor according to claim 30 wherein said substrate comprises an insulator.

34. The sensor according to claim 30, wherein said substrate is formed with a thin insulating coating from at least one noble metal and an oxide selected from the group consisting of: yttrium oxide, cerium oxide, zirconium oxide, and combinations of these.

* * * * *